United States Patent
McBrearty et al.

(10) Patent No.: US 6,748,550 B2
(45) Date of Patent: Jun. 8, 2004

(54) APPARATUS AND METHOD FOR BUILDING METADATA USING A HEARTBEAT OF A CLUSTERED SYSTEM

(75) Inventors: Gerald Francis McBrearty, Austin, TX (US); Johnny Meng-Han Shieh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 539 days.

(21) Appl. No.: 09/876,045

(22) Filed: Jun. 7, 2001

(65) Prior Publication Data

US 2002/0188891 A1 Dec. 12, 2002

(51) Int. Cl.[7] .................................. G06F 11/00
(52) U.S. Cl. ............................. 714/4; 714/15
(58) Field of Search .................. 714/4, 18, 20, 714/15, 55; 709/224

(56) References Cited

U.S. PATENT DOCUMENTS

| | | | |
|---|---|---|---|
| 5,666,484 A | * 9/1997 | Orimo et al. | 714/18 |
| 5,715,393 A | * 2/1998 | Naugle | 709/224 |
| 6,167,438 A | * 12/2000 | Yates et al. | 709/216 |
| 6,173,418 B1 | * 1/2001 | Fujino et al. | 714/20 |
| 6,272,648 B1 | * 8/2001 | Findlay et al. | 714/4 |
| 6,501,950 B1 | * 12/2002 | Smith et al. | 455/423 |
| 2003/0061318 A1 | * 3/2003 | Abdelhadi et al. | 709/221 |
| 2003/0135514 A1 | * 7/2003 | Patel et al. | 707/102 |
| 2003/0233594 A1 | * 12/2003 | Earl | 714/4 |

OTHER PUBLICATIONS

Golab, Lukasz "Issues in Data Stream Management" Data unknown.*
Fielding, Roy "Principled Design of the Modern Web Architecture" ACM Transactions on Internet Technology, vol. 2, No. 2, May 2002, pp. 115–150.*
Brodsky, Dmitry "Using Fine-grained connectivity to implement a peer-topeer file system" IEEE 2002.*
Stevens, W. Richard TCP/IP Illustrated vol. 1: the protocols.*

* cited by examiner

*Primary Examiner*—Robert Beausoliel
*Assistant Examiner*—Bryce P. Bonzo
(74) *Attorney, Agent, or Firm*—Duke W. Yee; Volel Emile; Stephen J. Walder, Jr.

(57) ABSTRACT

An apparatus and method for building metadata using a heartbeat of a clustered system are provided. The apparatus and method send portions of metadata for a computer system resource, to each of the other computer systems in the clustered system as a heartbeat data message. Upon receiving the heartbeat data message having the portion of metadata, the receiving computer systems store the portion of metadata in a temporary storage until all of the metadata is received. In subsequent heartbeat data messages, the remaining portions of the metadata are transmitted to the computer systems which, upon receiving all portions of the metadata, store the metadata in a secure location. If the sending computer system were to fail, the metadata stored in the secure location is read and used to takeover the resources of the failed computer system. In this way, the processing cycles used to read in the metadata from the resources of the failed computer system in the prior art are eliminated.

38 Claims, 6 Drawing Sheets

APPARATUS AND METHOD FOR BUILDING METADATA USING A HEARTBEAT OF A CLUSTERED SYSTEM

BACKGROUND OF THE INVENTION

1. Technical Field

The present invention is directed to an improved computing device. More specifically, the present invention is directed to an apparatus and method for building metadata using a heartbeat of a clustered system.

2. Description of Related Art

Computer clusters are generally used to perform a multitude of different computing functions because of their fault tolerance and load balancing capabilities. With a computer cluster, multiple computer systems are linked together in order to handle variable workloads or to provide continued operation in the event one fails. Each computer may be a multiprocessor system itself. For example, a cluster of four computers, each with four CPUs, would provide a total of 16 CPUs processing simultaneously. If one of the computers fails, one or more additional computers are still available and may actually take over the functions of the failed computer. In addition, load balancing mechanisms in the computer cluster are able to distribute the workload over the multiple computer systems, thereby reducing the burden on each of the computer systems.

Computer systems within the clustered system typically monitor each other's presence using a heartbeat signal or "keep alive" signal. Each computer system in the clustered system periodically sends out a heartbeat signal to the other computer systems in the clustered system essentially informing them that the sending computer system is still active and do not need their resources taken over by another computer system in the clustered system. If a heartbeat signal is not received from one of the computer systems in the clustered system, the other computer systems will determine that the computer system has failed.

When a member of the cluster has failed, i.e. when a heartbeat signal from one of the computer systems in the clustered system is not received by the other computer systems, or is otherwise not available to the clustered system, the other members of the clustered system must take over for the missing member. However, upon takeover of the functions of the missing system's resource (typically hard disk storage), the remaining members must learn or surmise the configuration of the resources that the missing system was using. This is typically done by having the computer system that is taking over the resources read in the metadata from the resource. The metadata from the resource is data that describes the configuration of the resource, e.g. the file system, data areas, and the like.

The reading in of the metadata from the resource upon detection of a failed computing system in the clustered system may take many processor cycles to complete. In some instances, the reading in of this metadata may take upwards of several minutes to complete. In some clustered systems, a delay of multiple seconds or minutes may mean heavy financial losses. For example, in a clustered system that is used to handle financial transactions, stock purchasing and selling, or the like, a delay of several minutes may cause a large financial impact. Thus, it would be beneficial to have a method and apparatus for minimizing the amount of time necessary for a computer system to takeover the resources of a failed computer system in a clustered system.

SUMMARY OF THE INVENTION

The present invention provides an apparatus and method for building metadata using a heartbeat of a clustered system. The present invention sends portions of metadata for a computer system resource, to each of the other computer systems in the clustered system as a heartbeat data message. Upon receiving the heartbeat data message having the portion of metadata, the receiving computer systems store the portion of metadata in a temporary storage until all of the metadata is received.

In subsequent heartbeat data messages, the remaining portions of the metadata are transmitted to the computer systems which, upon receiving all portions of the metadata, store the metadata in a secure location. If the sending computer system were to fail, the metadata stored in the secure location is read and used to takeover the resources of the failed computer system. In this way, the processing cycles used to read in the metadata from the resources of the failed computer system in the prior art are eliminated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
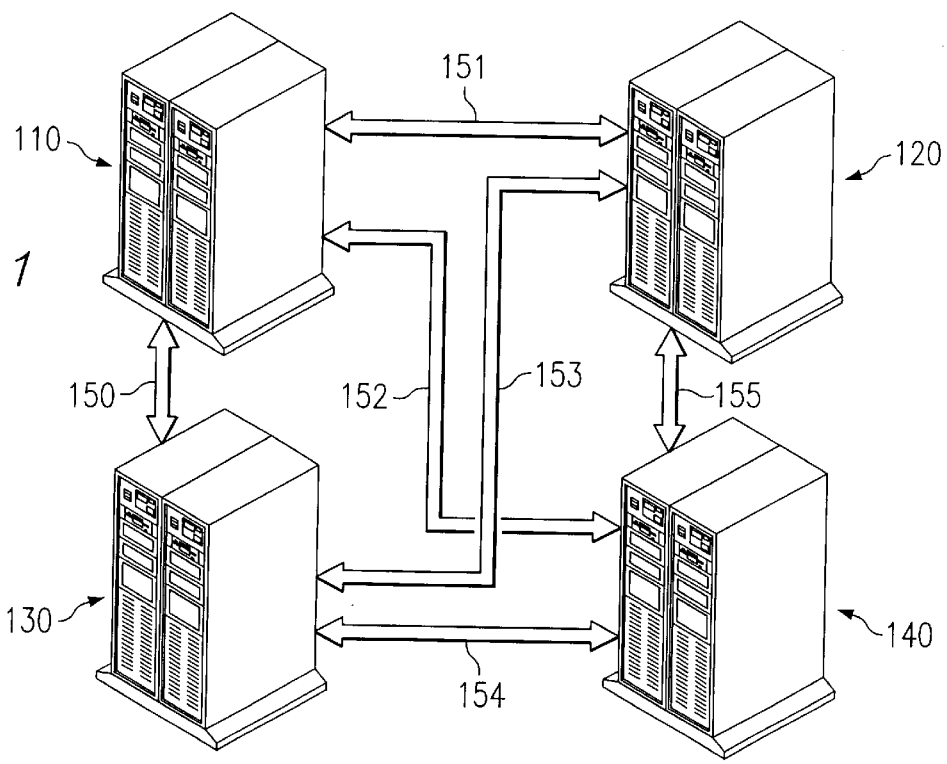
FIG. 1 is an exemplary diagram of a clustered computing system in accordance with the present invention.

With reference now to the figures, and in particular FIG. 1, a clustered computing system 100 in accordance with the present invention is shown. The clustered computer system 100 includes a plurality of computing systems 110–140 that are in communication with one another. The computing systems 110–140 constitute a cluster in which a first computing system may be used as a backup of a second computing system should the second computing system fail. The functions and resources of the failed second computing system may be taken over by the first computing system in a manner generally known in the art.

The computing systems 110–140 may be any type of computing system that may be arranged in a cluster with other computing systems. For example, the computing systems 110–140 may be server computers, client computers, and the like. The computing systems 110–140 may be single processor systems or multiprocessor systems. In short, any type of computing system that may be used in a cluster with other computing systems is intended to be within the spirit and scope of the present invention.

The computing systems 110–140 are coupled to one another via communication links 150–155. The communication links 150–155 may be any type of communication links that provide for the transmission of data between the computing systems 110–140. For example, the communication links may be wired, wireless, fiber optic links, satellite links, infrared links, data buses, a local area network (LAN), wide area network (WAN), the Internet, or the like. Any type of communication link may be used without departing from the spirit and scope of the present invention.

Figure 2:
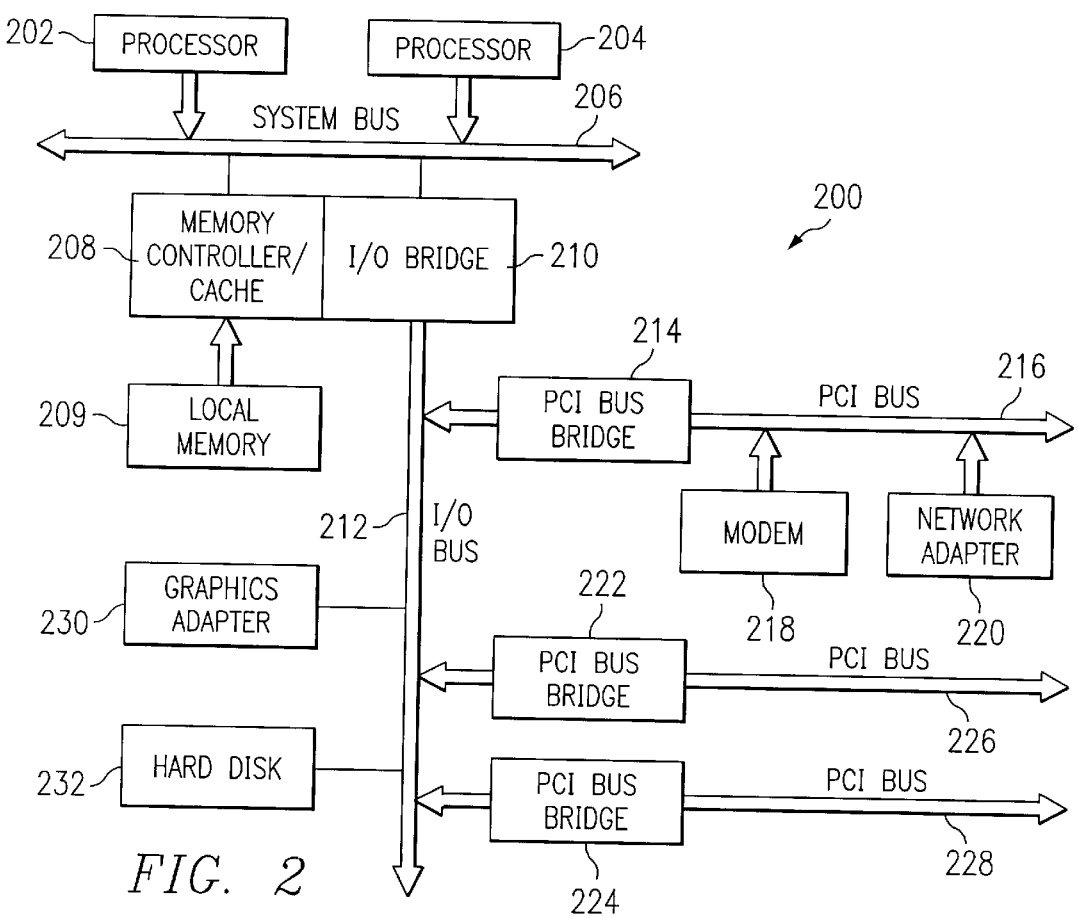
FIG. 2 is an exemplary diagram illustrating a distributed data processing system in accordance with the present invention.

Referring to FIG. 2, a block diagram of a data processing system that may be implemented as a computing system in a clustered system, such as clustered system 100 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

The present invention provides a mechanism by which metadata for resources of the computing systems 110–140 is sent to each of the other computing systems 110–140 in small portions as heartbeat data messages. The sending of metadata in this manner performs two important functions. First, the small portion of metadata acts as a heartbeat data message that informs the other computing systems 110–140 that the sending computing system is still active. Second, the small portions of metadata in multiple heartbeat data messages may be accumulated to obtain all of the metadata for the particular resources of the sending computing system. In this way, the other computing systems 110–140 in the cluster 100 are informed of the current resource configurations prior to a failure. Thus, when a failure occurs, the computing system that takes over the resources of the failed computing system is already informed of the resource configuration and need not spend valuable processing cycles obtaining this information from the failed computing system resource.

Figure 3:
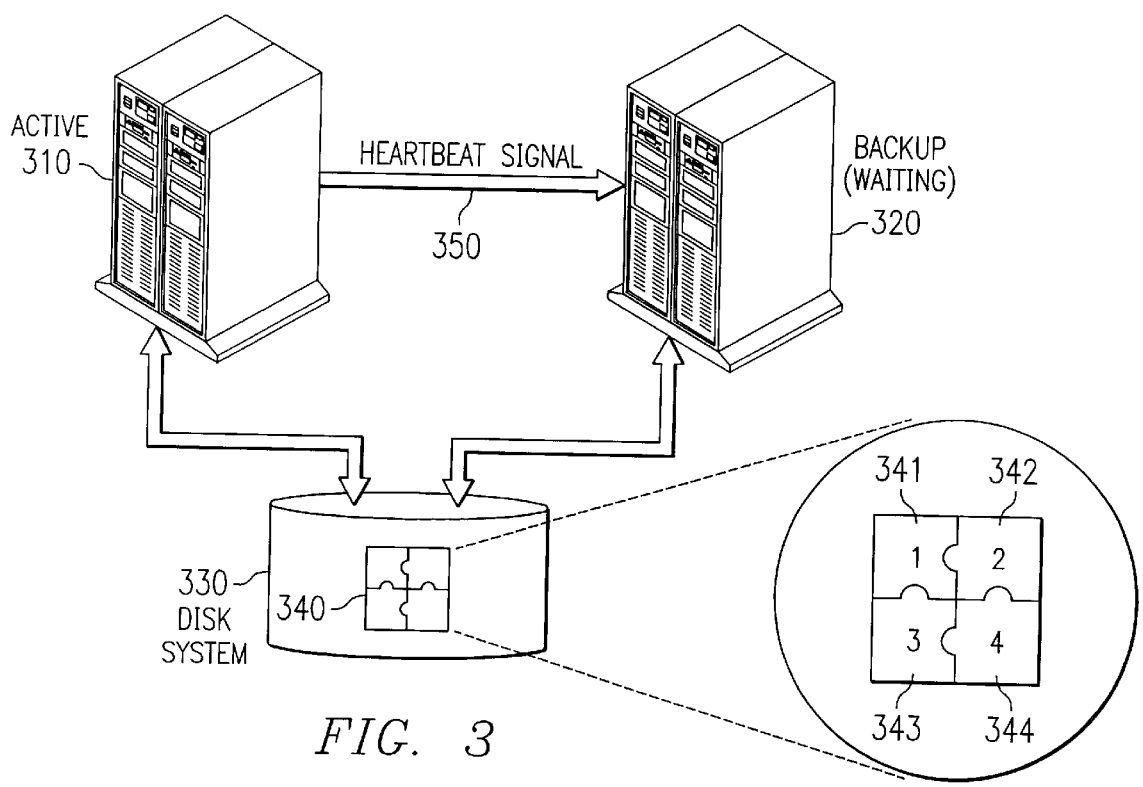
FIG. 3 is an exemplary diagram illustrating a prior art method of sending a heartbeat signal to computing devices in the clustered computing system.

FIG. 3 is an exemplary diagram illustrating a portion of a prior art cluster system heartbeat method. As shown in FIG. 3, the portion of the cluster system shown includes only a single active computing system 310 and a backup computing system 320, for simplicity of explanation. In actuality, there may be multiple active computing systems 310 and multiple backup computing systems 320. While the backup computing system 320 is indicated as being in a "waiting" state, the backup computing system 320 is only "waiting" with respect to taking over the functions and resources of the active computing system 310. The backup computing system 320 may be actively performing its own set of functions while waiting to takeover the functions and resources of the active computing system 310.

The active computing system 310 has at least one resource 330 that may be taken over by the backup computing system 320. The resource 330 shown in FIG. 3 is a disk system, such as a hard disk system, however the present invention is not limited to any particular type or number of resources. Thus, the backup computing system 320 may takeover control of a plurality of resources of the active computing system 310, and the resources may comprise disk systems, memory, tape drive systems, CD-ROM and/or DVD-ROM drive systems, processors, and the like.

The resource 330 has associated metadata 340 that describes the current state of the resource 330. This metadata 340 may be stored in the resource 330 itself or in data structure in a memory or storage device of the active computing system 310. The metadata 340 is comprised of a plurality of metadata portions 341–344. For simplicity, the metadata 330 is shown as being stored in the resource 340.

The active computing system 310 is in communication with the backup computing system 320 and resource 330 via communication links. Similarly, the backup computing system 320 is in communication with the active computing system 310 and the resource 330 via the same or different communication links. Thus, the backup computing system 320 is capable of obtaining metadata regarding the resource 330 from either the active computing system 310 or the resource 330, depending on the embodiment, as well as obtaining control of the resource 330.

The active computing system 310 periodically transmits a heartbeat signal 350 to the other computing systems in the cluster, such as backup computing system 320. The heartbeat signal 350 informs the backup computing system 320 that the active computing system 310 is still "alive" and that it is not necessary for the backup computing system 320 to takeover the functions of the active computing system 310 and control of the resource 330.

If a failure is detected in the active computing system 310, the other computing systems in the cluster may "vote" on whether or not the functions and resources of the failed computing system should be taken over. For example, there is a possibility that the computing system that expects to receive the heartbeat signal from other computing systems in the cluster does not receive the heartbeat signal from a first computing system due to a failure in a communication link with the first computing system. In such an instance, a voting mechanism in the cluster program code allows the other computing systems in the cluster to vote on whether or not the functions of the first computing system should be taken over. Such voting may be performed by the computing systems themselves or may be performed by the resources. Only when it is determined from the vote that an actual failure of a computing system has occurred will the functions and resources of the failed computing system be taken over by another computing system in the cluster.

Figure 4:
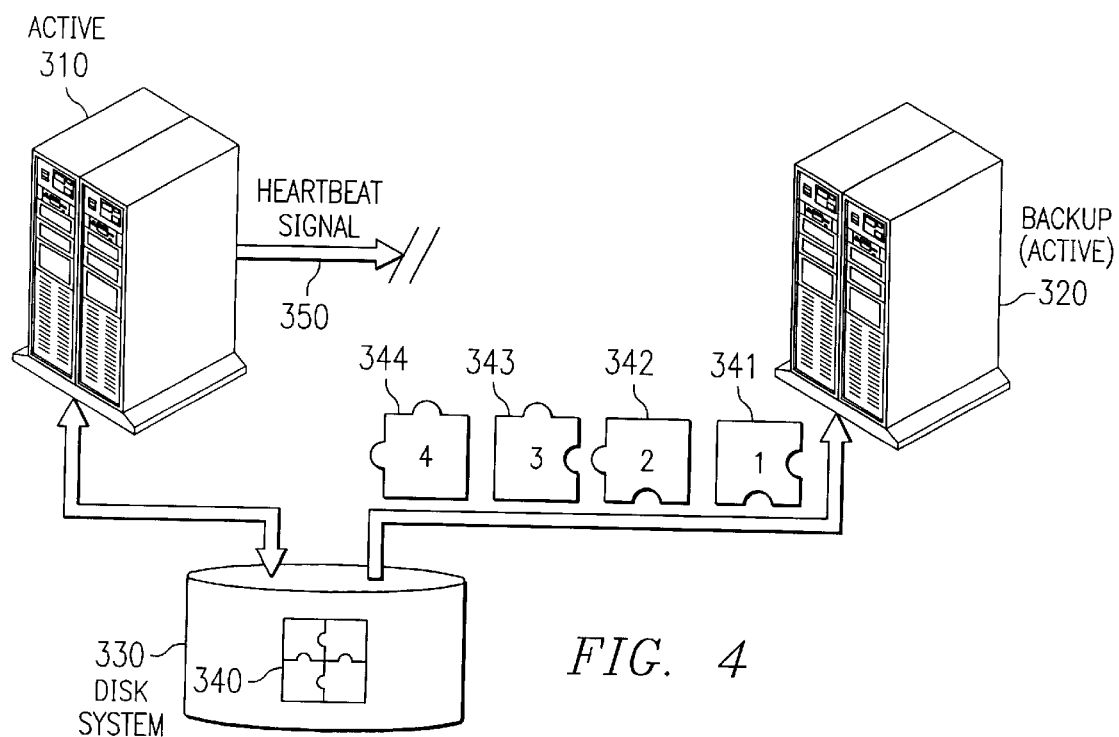
FIG. 4 is an exemplary diagram illustrating a prior art operation when a computing device in the clustered computing system fails.

FIG. 4 is an exemplary diagram of the prior art cluster system when a failure occurs in the active computing system 310. If the active computing system 310 fails, the heartbeat signal 350 is not transmitted to the backup computing system 320. The backup computing system 320 determines that a heartbeat signal has not been received from the active computing system 310 within a predetermined period of time and proceeds to takeover the functions and resources of the active computing system 310.

As a result of the failure of the active computing system 310, the backup computing system 320 reads the metadata 340 from the resource 330. The portions of metadata 341–344 are transmitted to the backup computing system 320 which then processes the metadata 340 to determine the current resource state. Based on this resource state, the backup computing system 320 may now access the resource in performing the functions of the failed computing system 310.

As mentioned above, the prior art mechanism described above with regard to FIGS. 3 and 4 suffers from the drawback that a large amount of processing time is necessary to read and compile the metadata 340 for the resource 330 after the failure of the active computing system 310. Such delay may result in large losses for the operator of the cluster computing system.

Figure 5A:
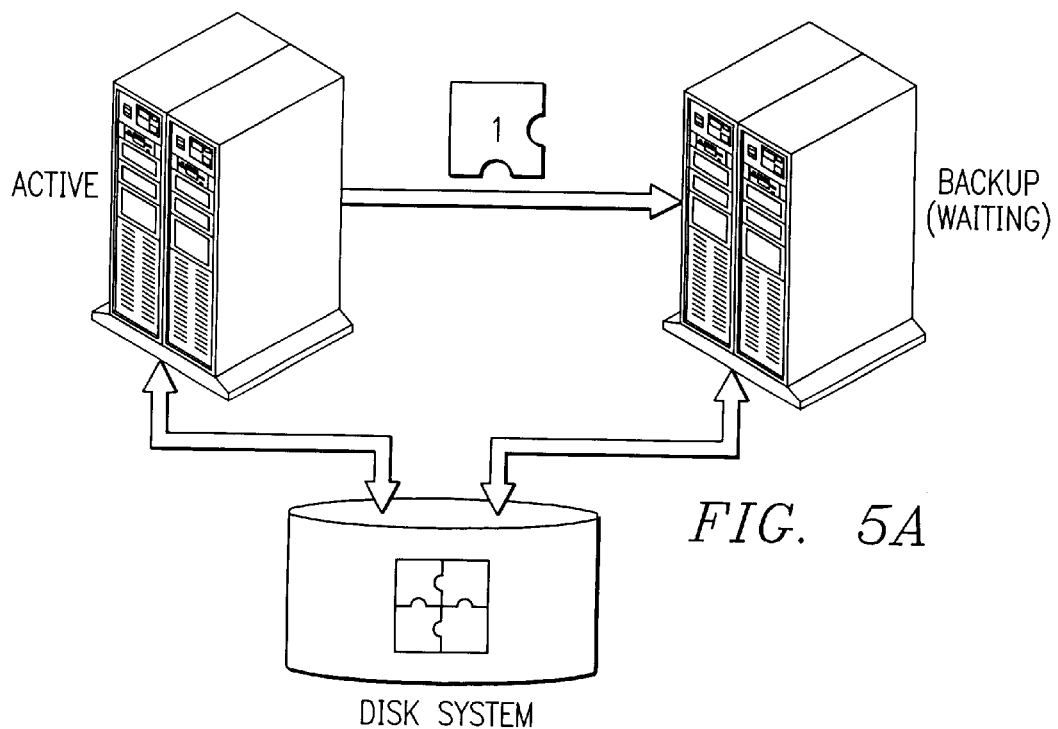
FIGS. 5A–5D are diagrams illustrating a normal operation according to the present invention.
Figure 5B:
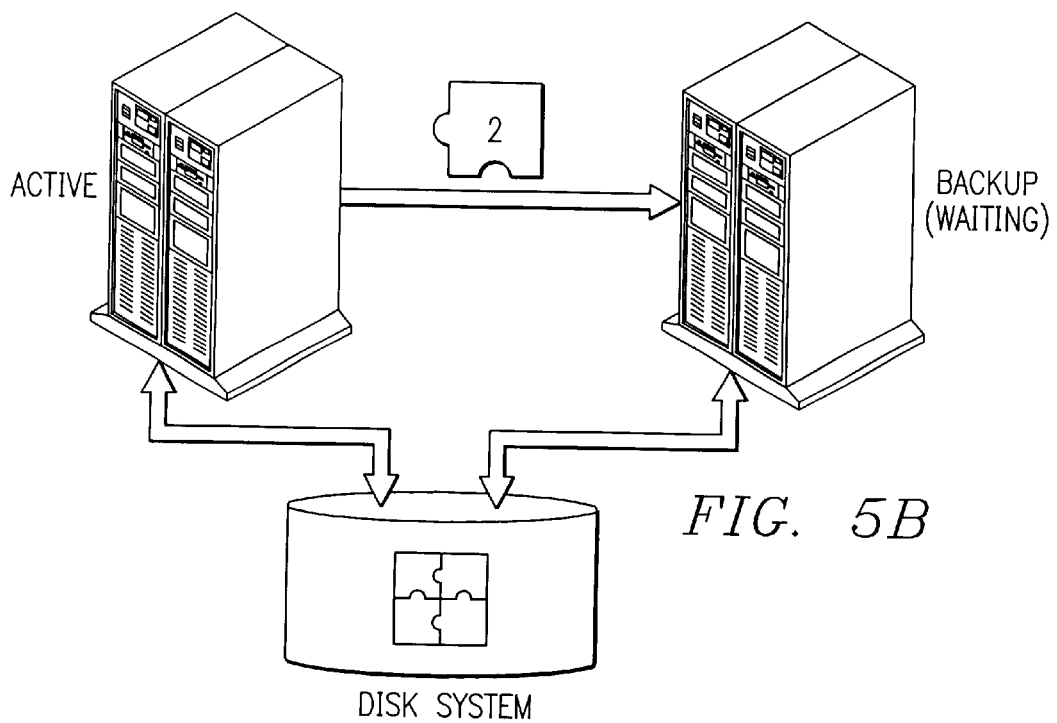
Figure 5C:
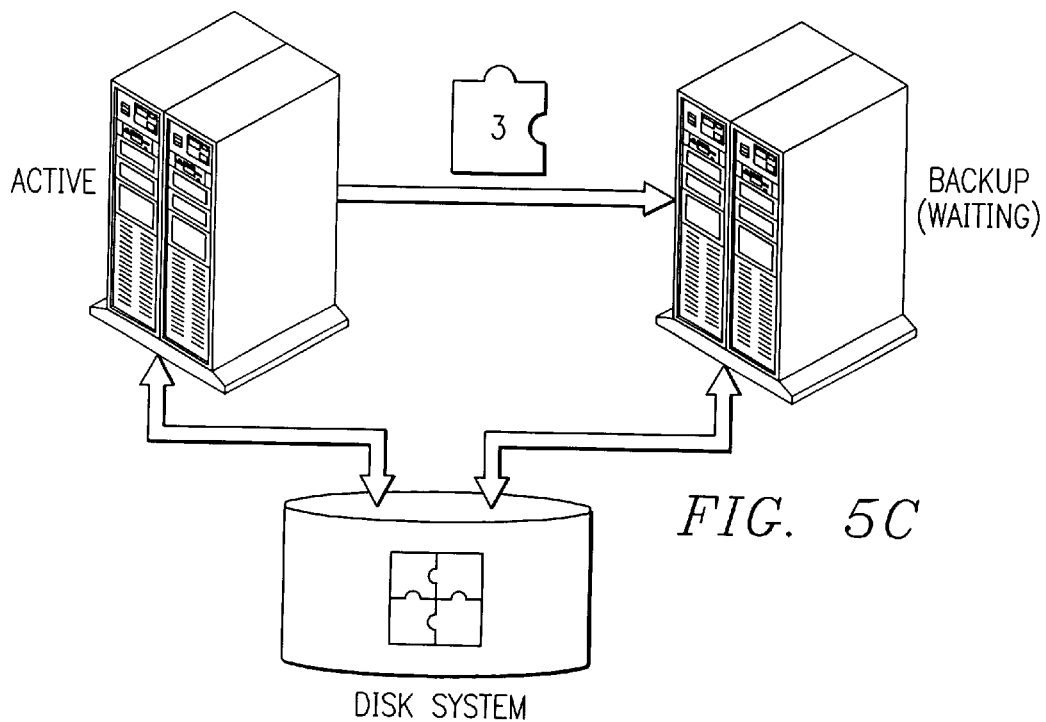
Figure 5D:
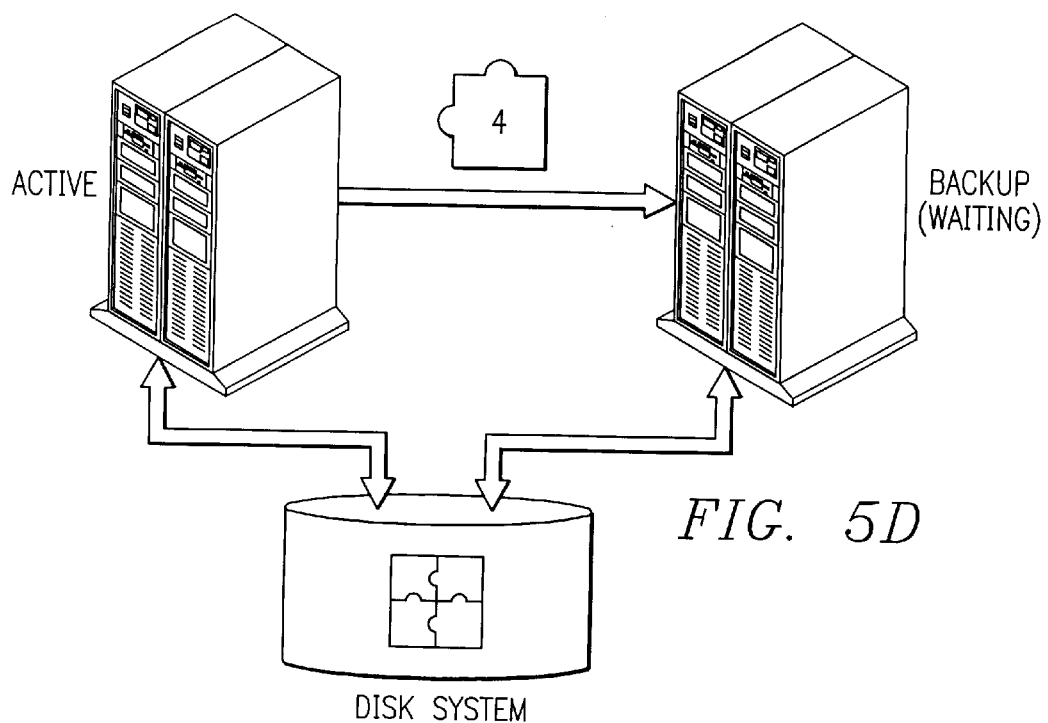

FIGS. 5A–5B illustrate a cluster computing system in accordance with the present invention during normal operation. As shown in FIGS. 5A–5B, rather than simply sending a heartbeat signal to the other computing systems in the cluster, with the present invention the active computing system 505 actually sends a portion of the metadata as a heartbeat ping 510–540 to the other computer systems, such as backup computer system 550.

When the receiving computing system receives the metadata ping 510–540, the receiving computer system interprets the reception of the metadata ping 510–540 as an indication that the active computing system 505 is still functioning as a member of the cluster. In addition, the portion of metadata transmitted in the metadata ping 510–540 is stored in a temporary storage (not shown), such as in memory or in a storage device associated with the receiving computing system, in order to assemble the resource metadata of the resource 560.

Thus, when a computing system, such as active computing system 505, fails, the other remaining computing systems in the cluster already have a copy of the most likely latest metadata and do not need to go through the process of relearning the metadata of the missing system's resources, such as resource 560.

The metadata pings 510–540 must be small in size so as not to produce too much traffic along the communication links between the computing systems of the cluster. Thus, only a small number of bytes of data are transmitted with each of the metadata pings 510–540. For example, the number of bytes of data transmitted in a single metadata ping may be on the order of 50 bytes. The receiving computing system stores the 50 bytes of metadata in a temporary location and slowly builds up a record of the metadata until the metadata is complete.

When the latest transmitted metadata is complete, the metadata record(s) are transferred to a secure storage location for use in recovering the functions and resources of a failed computing system in the cluster. When the metadata record(s) are transferred to the secure storage location, they will overwrite any previous version of the same metadata. In this way, the latest complete set of metadata will be used to recover the failed computing system resources until a more current complete version of the metadata is compiled.

Figure 6:
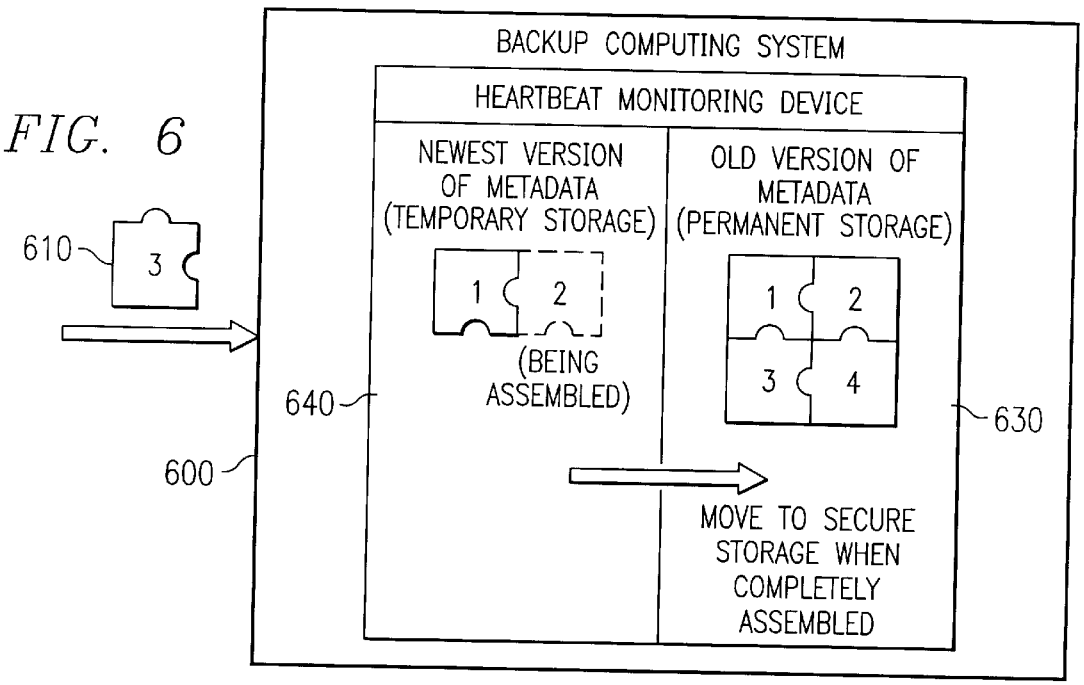
FIG. 6 is a diagram illustrating an operation of the present invention when building metadata from heartbeat data.

FIG. 6 is an exemplary diagram illustrating how the present invention builds versions of the metadata based on the metadata pings. As shown in FIG. 6, the backup computing system 600 includes a heartbeat monitoring device 620 that monitors, for example, a port of a network interface associated with the backup computing system 600 for metadata pings from the other computing systems in the cluster. The heartbeat monitoring device 620 receives these metadata pings and assembles them in a temporary storage 640. Once a complete version of the metadata is assembled in the temporary storage, the heartbeat monitoring device 620 moves the complete metadata record(s) to secure storage 630.

Thus, for example, as shown in FIG. 6, the heartbeat monitoring device 620 has already assembled a first complete version of the metadata 635 in the secure storage 630. The heartbeat monitoring device 620 is currently assembling a subsequent version of the metadata in the temporary storage 640 and has already received portions 1 and 2 of the subsequent version. Portion 3 is currently being received by the heartbeat monitoring device 620 in the metadata ping 610.

In addition to just the metadata itself, the metadata portions in the metadata pings 610 may further include time stamp information identifying the last time of modification of the metadata associated with the metadata portion. In other words, if the metadata was last modified on Jul. 6, 2000 at 12:01:13 hours, this time stamp would be associated with one or more of the portions of metadata being transmitted in the metadata pings. If the metadata is later modified, such as on Feb. 16, 2001 at 16:32:45 hours, this new time stamp will be associated with the metadata portions being transmitted thereafter. In this way, the heartbeat monitoring device 620 may be able to determine whether the metadata portions being received correspond to a modified version of the metadata from that stored in the secure storage 630. This type of determination is important to deciding whether to use the complete version of the metadata stored in the secure storage, as detailed hereafter.

There are three potential times when the active computing system may fail:

(1) the active computing system may fail after the completion of enough metadata pings to rebuild the metadata record(s);
(2) the active computing system may fail during the building of metadata record(s) but there was no change activity to the resources; and
(3) the active computing system may fail during the building of metadata record(s) and there was change activity to the resources.

Each of these possible occurrences will now be addressed with a description of how the present invention handles each.

When the active computing system fails after the completion of enough metadata pings to rebuild the metadata record(s), the complete version of the metadata stored in the secure storage 640 may be used to determine the current state of the failed computing system resources. This situation arises when the computing system fails immediately after sending the last portion of a complete version of the metadata to the other computing systems but before sending the next metadata ping having a first portion of the metadata. This is the simplest of the three possible cases.

When the active computing system fails during the building of metadata record(s) but there was no change activity to the resources, the incomplete version of the metadata in the temporary storage 630 may be discarded and the old version of the metadata in the secure storage 640 may be utilized to determine the state of the resources. The determination of whether there is a change activity to the resources may be based on time stamp information associated with the portions of metadata received in the metadata pings. That is, the heartbeat monitoring device 620 may initialize a flag indicating whether the portions of metadata have a different time stamp than the old version of the metadata stored in the secure storage 640 or in previous portions of metadata received for the version being built in the temporary storage 630. A comparison of time stamps may then be performed when portions of metadata are received to determine if the flag should be set to indicate that a change activity in the resources has occurred. Based on the state of the flag, the heartbeat monitoring device 620 may be able to determine whether to use the old version in the secure storage 640 or the new version in the temporary storage 630.

For example, assume a first portion of metadata is received from a first metadata ping and that the first portion has a time stamp of Jul. 1, 2000, 12:01:03. The heartbeat monitoring device 620 may compare this time stamp to a time stamp associated with the metadata stored in the secure storage 640. If the time stamps are the same, the metadata stored in the secure storage 640 may be used to determine the state of the resources. If the time stamps are different, and because the new version in the temporary storage is not complete, neither the metadata in the temporary storage nor the metadata in the secure storage may be used to determine the state of the resources. In this case, which corresponds to possibility (3) above, a change activity in the resource has occurred and the backup computing system must resort to the prior art method for obtaining metadata about the resource, i.e. reading the metadata from the resource.

Figure 7:
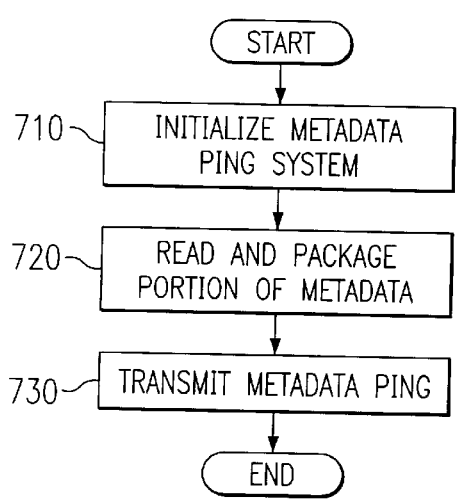
FIG. 7 is a flowchart outlining an exemplary operation of the present invention when transmitting a metadata ping data message.

FIG. 7 is a flowchart outlining an exemplary operation when transmitting metadata pings to other computing systems in a cluster. As shown in FIG. 7, the operation starts with an initialization of the metadata ping system (step 710). A portion of metadata stored in memory, or in the resource, is read and packaged into a metadata ping data message (step 720). The portion of metadata may be of a size commensurate with the size of the metadata ping, such as 50 bytes for example. The metadata ping data message is then transmitted to all of the other computing systems in the cluster (step 730). The operation then continues with the next portion of metadata. If the previously sent portion of metadata was a last portion, the next portion of metadata may be the first portion of the metadata. Thus, the operation continues to send metadata in a wrap-around manner.

Figure 8:
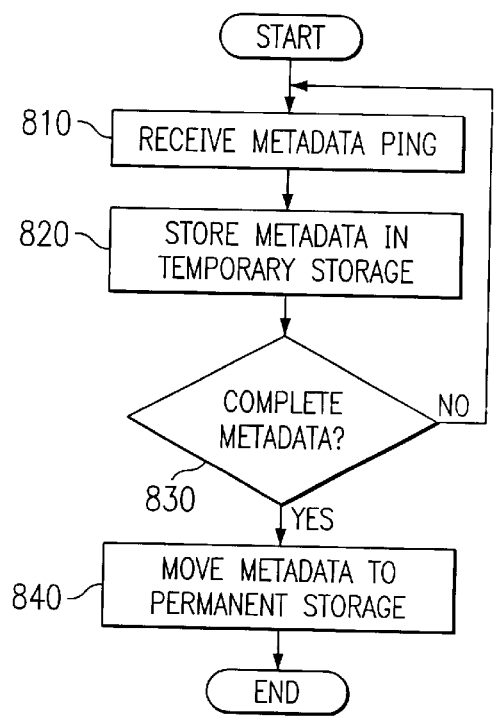
FIG. 8 is a flowchart outlining an exemplary operation of the present invention when compiling a version of metadata using metadata received in metadata pings from another computing system.

FIG. 8 is a flowchart outlining an exemplary operation of the present invention when compiling versions of the metadata. As shown in FIG. 8, the operation starts with the receipt of a metadata ping from another computing system in the cluster (step 810). The metadata in the metadata ping is stored in a temporary storage.(step 820). A determination is made as to whether all of the metadata to form a complete version of metadata is present in the temporary storage (step 830). If so, the version of metadata stored in the temporary storage is moved to a permanent storage (step 840). The operation may then end until a next portion of metadata is received when the operation is again invoked.

If there is not enough metadata in the temporary storage, the operation returns to step 810 and waits until the next metadata ping is received. The operation is then repeated until a full version of metadata is stored in the temporary storage and may be transferred to the permanent storage.

Figure 9:
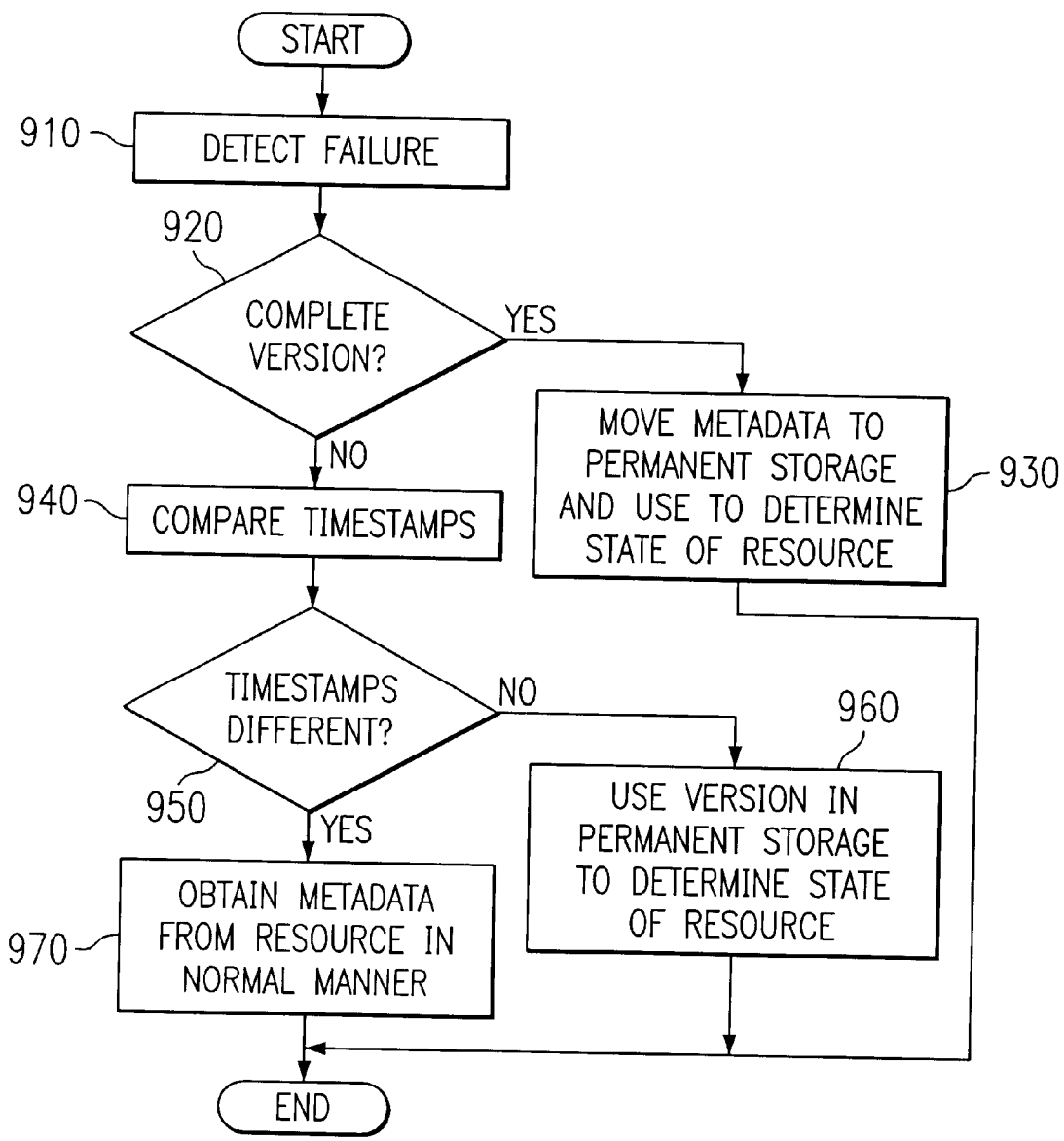
FIG. 9 is a flowchart outlining an exemplary operation of the present invention when determining which version of metadata to use in determining a state of a resource.

FIG. 9 is a flowchart outlining an exemplary operation of the present invention when determining which version of metadata to use in determining the state of the resource in the event of a failure. As shown in FIG. 9, the operation starts with detection of a failure in a computing system of the cluster (step 910). The detection of the failure may be based on non-receipt of a metadata ping from the computing system, for example.

A determination is made as to whether a complete version of metadata is present in the temporary storage (step 920). If so, the complete version of metadata in the temporary storage is moved to the permanent storage and used to determine the state of the resource (step 930).

If a complete version of metadata is not present in the temporary storage, a comparison of the time stamps of the metadata stored in the temporary storage with the metadata version stored in the permanent storage is made (step 940). A determination is made as to whether the time stamps are different (step 950). If the time stamps are not different, then the version of metadata stored in the permanent storage may be used to determine the state of the resource (step 960). Otherwise, if the time stamps are different, neither version of metadata may be used, and the metadata must be read from the resource or failed computing system memory in a manner similar to that of the prior art (step 970). The operation is then ended.

Thus, the present invention provides a mechanism by which metadata may be used as a heartbeat data message for indicating to other computing systems in a cluster that the sending computing system is still active. The metadata stored in the metadata ping may be used to compile a complete version of metadata so that, in the event of a failure, the computing system(s) that are taking over the functions and resources of the failed computing system may be informed of the current state of the resources without having to expend processing cycles retrieving the metadata from the resource themselves. In this way, the present invention significantly speeds up the process of handing over control of functions and resources to computing systems in a cluster in the event of a computing system failure.

In a further embodiment of the present invention, rather than sending metadata portions in the metadata ping, only the time stamp need be sent in the metadata ping. The time stamp may then be compared to the time stamp of the old version of the metadata in the permanent storage. Only when the two time stamps differ will the active computing system begin sending portions of metadata to the backup computing system. In this way, the amount of data transmitted between computing systems and the processing of this data is minimized. Only when it is necessary to send the metadata pings will they actually be sent. All other times, only the metadata time stamp for the current version of metadata in the resource or computing system memory need be sent.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of building metadata of a resource for use in determining state of the resource, comprising:
    receiving a metadata ping from a sending computing system, the metadata ping identifying the sending computing system as being active and having a portion of metadata associated with a resource of the sending computing system;
    storing the portion of metadata from the metadata ping in a temporary storage, wherein a plurality of portions of metadata comprise a complete copy of metadata; and
    moving the complete copy of metadata from the temporary storage to a permanent storage when the complete copy of the metadata is present in the temporary storage.

2. The method of claim 1, wherein the metadata ping includes time stamp information identifying a last modification time of the metadata.

3. The method of claim 1, wherein the metadata in the metadata ping is approximately 50 bytes of metadata.

4. The method of claim 1, further comprising:
    detecting a failure of a computing system; and
    selecting one of the metadata in the temporary storage, the metadata in the permanent storage, or metadata stored in the resource to determine the state of the resource.

5. The method of claim 4, wherein selecting one of the metadata includes:
    determining if a complete copy of the metadata is present in the temporary storage.

6. The method of claim 5, wherein selecting one of the metadata further includes:
    moving the complete copy of the metadata from the temporary storage to the permanent storage if a complete copy of the metadata is present in the temporary storage; and
    identifying the state of the resource based on the complete copy of the metadata moved to the permanent storage.

7. The method of claim 4, wherein selecting one of the metadata includes:
    comparing a timestamp of one or more portions of metadata in the temporary storage to a timestamp of a complete copy of metadata in the permanent storage; and
    identifying the state of the resource based on the complete copy of metadata in the permanent storage if the timestamps are the same.

8. The method of claim 4, wherein selecting one of the metadata includes:
    comparing a timestamp of one or more portions of metadata in the temporary storage to a timestamp of a complete copy of metadata in the permanent storage;
    retrieving a copy of metadata from the resource if the timestamps are different; and
    identifying the state of the resource based on the copy of metadata retrieved from the resource.

9. The method of claim 4, wherein metadata in the temporary storage is used to identify the state of the resource if enough metadata pings have been received to build a complete copy of metadata in the temporary storage.

10. The method of claim 4, wherein the metadata in the permanent storage is used to identify the state of the resource if the failure of the computing system occurs during the building of a copy of metadata in the temporary storage and no change to the state of the resource occurred.

11. The method of claim 4, wherein the metadata stored in the resource is used to identify the state of the resource if the failure of the computing system occurs during the building of a copy of metadata in the temporary storage and there was a change to the state of the resource.

12. The method of claim 1, wherein the method is implemented in a cluster computing system.

13. An apparatus for building metadata of a resource for use in determining state of the resource, comprising:
    an interface through which a metadata ping is received from a sending computing system, the metadata ping identifying the sending computing system as being active and having a portion of metadata associated with a resource of the sending computing system;
    a temporary storage device coupled to the interface that stores the portion of metadata from the metadata ping in a temporary storage, wherein a plurality of portions of metadata comprise a complete copy of metadata; and
    a processor that moves the complete copy of metadata from the temporary storage device to a permanent storage device when the complete copy of the metadata is present in the temporary storage device.

14. The apparatus of claim 13, wherein the metadata ping includes time stamp information identifying a last modification time of the metadata.

15. The apparatus of claim 13, wherein the metadata in the metadata ping is approximately 50 bytes of metadata.

16. The apparatus of claim 13, wherein the processor detects a failure of a computing system and selects one of the metadata in the temporary storage, the metadata in the permanent storage, or metadata stored in the resource to determine the state of the resource.

17. The apparatus of claim 16, wherein the processor selects one of the metadata by determining if a complete copy of the metadata is present in the temporary storage.

18. The apparatus of claim 17, wherein the processor further selects one of the metadata by moving the complete copy of the metadata from the temporary storage to the permanent storage if a complete copy of the metadata is present in the temporary storage, and identifying the state of the resource based on the complete copy of the metadata moved to the permanent storage.

19. The apparatus of claim 16, wherein the processor selects one of the metadata by comparing a timestamp of one or more portions of metadata in the temporary storage to a timestamp of a complete copy of metadata in the permanent storage, and identifying the state of the resource based on the complete copy of metadata in the permanent storage if the timestamps are the same.

20. The apparatus of claim 16, wherein the processor selects one of the metadata by comparing a timestamp of one or more portions of metadata in the temporary storage to a timestamp of a complete copy of metadata in the permanent storage, retrieving a copy of metadata from the resource if the timestamps are different, and identifying the state of the resource based on the copy of metadata retrieved from the resource.

21. The apparatus of claim 16, wherein metadata in the temporary storage is used by the processor to identify the state of the resource if enough metadata pings have been received to build a complete copy of metadata in the temporary storage.

22. The apparatus of claim 16, wherein the metadata in the permanent storage is used by the processor to identify the state of the resource if the failure of the computing system occurs during the building of a copy of metadata in the temporary storage and no change to the state of the resource occurred.

23. The apparatus of claim 16, wherein the metadata stored in the resource is used by the processor to identify the state of the resource if the failure of the computing system occurs during the building of a copy of metadata in the temporary storage and there was a change to the state of the resource.

24. The apparatus of claim 13, wherein the apparatus is part of a cluster computing system.

25. A computer program product in a computer readable medium for building metadata of a resource for use in determining state of the resource, comprising:

first instructions for receiving a metadata ping from a sending computing system, the metadata ping identifying the sending computing system as being active and having a portion of metadata associated with a resource of the sending computing system;

second instructions for storing the portion of metadata from the metadata ping in a temporary storage, wherein a plurality of portions of metadata comprise a complete copy of metadata; and third instructions for moving the complete copy of metadata from the temporary storage to a permanent storage when the complete copy of the metadata is present in the temporary storage.

26. The computer program product of claim 25, wherein the metadata ping includes time stamp information identifying a last modification time of the metadata.

27. The computer program product of claim 25, wherein the metadata in the metadata ping is approximately 50 bytes of metadata.

28. The computer program product of claim 25, further comprising:

fourth instructions for detecting a failure of a computing system; and fifth instructions for selecting one of the metadata in the temporary storage, the metadata in the permanent storage, or metadata stored in the resource to determine the state of the resource.

29. The computer program product of claim 28, wherein the fifth instructions for selecting one of the metadata include:

instructions for determining if a complete copy of the metadata is present in the temporary storage.

30. The computer program product of claim 29, wherein the fifth instructions for selecting one of the metadata further include:

instructions for moving the complete copy of the metadata from the temporary storage to the permanent storage if a complete copy of the metadata is present in the temporary storage; and instructions for identifying the state of the resource based on the complete copy of the metadata moved to the permanent storage.

31. The computer program product of claim 28, wherein the fifth instructions for selecting one of the metadata include:

instructions for comparing a timestamp of one or more portions of metadata in the temporary storage to a timestamp of a complete copy of metadata in the permanent storage; and instructions for identifying the state of the resource based on the complete copy of metadata in the permanent storage if the timestamps are the same.

32. The computer program product of claim 28, wherein the fifth instructions for selecting one of the metadata include:

instructions for comparing a timestamp of one or more portions of metadata in the temporary storage to a timestamp of a complete copy of metadata in the permanent storage;

instructions for retrieving a copy of metadata from the resource if the timestamps are different; and instructions for identifying the state of the resource based on the copy of metadata retrieved from the resource.

33. The computer program product of claim 28, wherein metadata in the temporary storage is used to identify the state of the resource if enough metadata pings have been received to build a complete copy of metadata in the temporary storage.

34. The computer program product of claim 28, wherein the metadata in the permanent storage is used to identify the state of the resource if the failure of the computing system occurs during the building of a copy of metadata in the temporary storage and no change to the state of the resource occurred.

35. The computer program product of claim 28, wherein the metadata stored in the resource is used to identify the state of the resource if the failure of the computing system occurs during the building of a copy of metadata in the temporary storage and there was a change to the state of the resource.

36. The computer program product of claim 25, wherein the computer program product is executed in a computing system of a cluster computing system.

37. A method, in a computing system, of sending metadata to a plurality of other computing systems, the metadata identifying a state of a resource, comprising:

reading a portion of the metadata;

packaging the portion of metadata into a metadata heartbeat data message; and transmitting the metadata heartbeat data message to the plurality of other computing systems, wherein the metadata heartbeat data message indicates that the computing system is still active.

38. The method of claim 37, wherein the computing system and other computing systems comprise a cluster computing system.

* * * * *